United States Patent
Siraky et al.

(10) Patent No.: US 8,575,931 B2
(45) Date of Patent: Nov. 5, 2013

(54) LENGTH MEASUREMENT APPARATUS

(75) Inventors: Josef Siraky, Donaueschingen (DE);
Florian Grieshaber, Schönwald (DE)

(73) Assignee: Sick Stegmann GmbH, Donaueschingen (DE)

( * ) Notice: Subject to any disclaimer, the term of this patent is extended or adjusted under 35 U.S.C. 154(b) by 270 days.

(21) Appl. No.: 12/971,573

(22) Filed: Dec. 17, 2010

(65) Prior Publication Data

US 2011/0148397 A1   Jun. 23, 2011

(30) Foreign Application Priority Data

Dec. 22, 2009 (EP) .................................. 09180353
Jan. 5, 2010 (EP) .................................. 10150088

(51) Int. Cl.
*G01R 33/00* (2006.01)

(52) U.S. Cl.
USPC .................. 324/260; 324/207.13; 324/207.17

(58) Field of Classification Search
USPC ................................ 324/260, 207.13, 207.17
See application file for complete search history.

(56) References Cited

FOREIGN PATENT DOCUMENTS

| DE | 3225500 A1 | 1/1984 |
| DE | 102004013022 B3 | 10/2005 |
| EP | 0909962 A2 | 4/1999 |
| GB | 2126348 A * | 3/1984 |

OTHER PUBLICATIONS

EPO Search Report, EP10150088 (German)—Performed Nov. 22, 2012—Mailed Nov. 30, 2012. This EPO Search report cites references to the filed Certified Foreign Priority Document in this case (EP 10150088.2).

* cited by examiner

*Primary Examiner* — Reena Aurora
(74) *Attorney, Agent, or Firm* — Nath, Goldberg & Meyer; Jerald L. Meyer; Scott Langford

(57) ABSTRACT

A length measurement apparatus (10) has a bistable magnetic element (102), an elongated physical scale (200) with a plurality of measurement graduation elements (202) spaced apart from one another and a reading head (100) movable relative to the physical scale (200) in its longitudinal extent and which includes a first and second reading head magnet (114a b) arranged transverse to the longitudinal extent and with opposite polarity to one another. The measurement graduation elements (202) each have a magnetic short-circuit element (202) to suppress the magnetic field (116a) of the first reading head magnet (114a) in a first relative position of the reading head (100) and the magnetic field (116b) of the second reading head magnet (114b) in a second relative position of the reading head (100).

18 Claims, 3 Drawing Sheets

LENGTH MEASUREMENT APPARATUS

Figure 1:
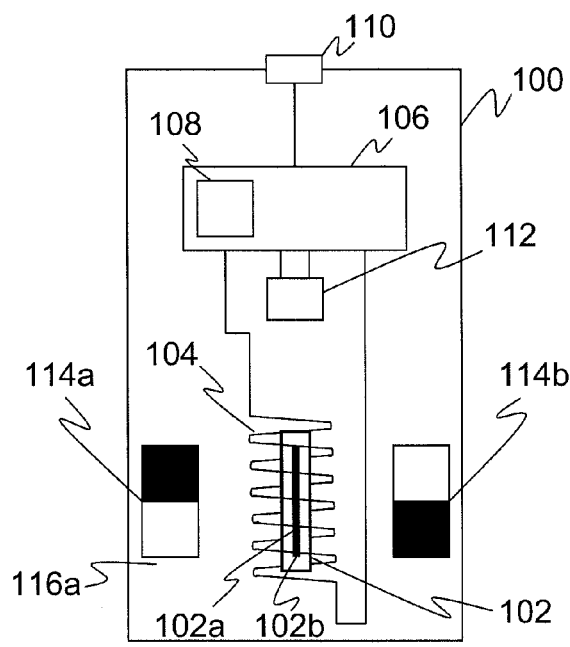

The invention relates to a length measurement apparatus and to a method for length measurement.

A known magnetic length measurement system works on the basis of the Wiegand effect. A Wiegand wire comprises a soft magnetic core and a hard magnetic jacket. If the magnetic fields of the core and jacket are initially aligned and if the Wiegand wire is introduced into an external magnetic field having opposite polarity, the direction of magnetization of the core reverses abruptly and, with an even stronger external magnetic field, also of the jacket. Each change of magnetization of the Wiegand wire is registered by induction of a voltage surge in a coil surrounding the Wiegand wire. The strongest voltage surge called ignition arises when only the polarity of the core reverses and in this process matches the polarity of the jacket. For this reason, the reversed reversal of magnetization of the core with respect to the jacket is also called biasing.

An important application field for magnetic length measurement systems is automation engineering where there is frequently a demand to detect the position of a linear movement device. Such a length measurement system is also called a track measurement system. Such length measurement systems frequently operate incrementally. When the installation is switched on, a reference travel has to be carried out to acquire an absolute position from the incremental information.

This is avoided in absolute magnetic length measurement systems. The position on the length scale is in this respect encoded in the measurement graduations. The reading head then actively works with its own energy supply to interpret the differently magnetized zones of the measurement graduations and to calculate an absolute position therefrom.

The physical scale of conventional absolute length measurement systems requires a complex and thus expensive encoding. In addition, the reading head must be designed in a more complex manner in accordance with the number of code tracks. In addition, the highest possible length of a physical scale which can be evaluated depends on the powerfulness of the encoding. The longer therefore the length measurement system should be, the more powerful the encoding must be, the more code tracks become necessary and the more complex the physical scale and the reading head become.

A further disadvantage of conventional solutions is found in the high effort for the manufacture of the physical scale. In this respect, magnets having alternating polarity are arranged transversely to the longitudinal extent of the physical scale or a magnetic carrier material is correspondingly magnetized. The required number of magnets is proportional to the length to be measured and such a physical scale is therefore relatively cost intensive. In addition, differences in the magnetization of the individual magnets do not allow any equidistant count intervals. It is also disturbing in an industrial environment that the magnets of the physical scale attract magnetic parts such as iron filings or small screws.

An apparatus for incremental angle of rotation measurement or length measurement is known from DE 34 08 478 C1. In this respect, a straight-line carrier having a measurement graduation formed as grooves is provided. A Wiegand wire is located transverse to the carrier in each groove, with the groove being wider than the Wiegand wire. If a sensing head having two magnets with reverse polarity to one another transversely to the carrier and thus parallel to the Wiegand wires travels over a groove, it initially triggers the reverse magnetization of the core of the Wiegand wire. The Wiegand wire then springs to the other end of the groove due to its changed magnetization where the magnetic field strength is high enough also to reverse the magnetization of the jacket. It is thus achieved by the wider grooves that even on a reversal of movement after the first ignition well-defined magnetic relationships are present and thus no Wiegand pulse is omitted, which would result in an incorrect count.

The complex physical scale with its grooves, covers and a number of Wiegand wires corresponding to the measurement graduations is disadvantageous in this prior art. The incremental length measurement also brings along the above-explained disadvantages with respect to an absolute measurement, for example the necessity of a reference travel.

It is therefore the object of the invention to provide a length measurement system having a simpler physical scale.

This object is satisfied by a length measurement system which has a bistable magnetic element, an elongated physical scale having a plurality of measurement graduation elements spaced apart from one another as well as a reading head which is movable relative to the physical scale in its longitudinal extent and which includes at least one first reading head magnet and one second reading head magnet which are arranged transverse to the longitudinal extent and with opposite polarity to one another, characterized in that the bistable magnetic element is part of the reading head; in that the measurement graduation elements each have a magnetic short-circuit element so that, on the arrangement of one of the reading head magnets at a measurement graduation element, its magnetic field is predominantly suppressed by the short-circuit element and thus does not penetrate through the bistable magnetic element; and in that the reading head magnets are spaced apart from one another so that the short-circuit element substantially only suppresses the magnetic field of the first reading head magnet in a first relative position of the reading head and substantially only suppresses the magnetic field of the second reading head magnet in a second relative position of the reading head.

The object is further satisfied by a method for length measurement, wherein a reading head which includes at least one first reading head magnet and one second reading head magnet is moved relative to an elongated physical scale having a plurality of measurement graduation elements spaced apart from one another, wherein the reading head magnets are arranged transverse to the longitudinal extent and are arranged with opposite polarity to one another, and wherein a bistable magnetic element is used for determining the position of the reading head, characterized in that the bistable magnetic element is moved along as part of the reading head, and in that, in a first relative position of the reading head, the first reading head magnet and, in a second relative position of the reading head, the second reading head magnet are arranged at a magnetic short-circuit element of a measurement graduation element such that substantially only the respective magnetic field of the other reading head magnet, that is of the second reading head magnet or of the first reading head magnet penetrates through the bistable magnetic element. In this respect, the invention starts from the basic idea of accommodating more complex components in the reading head and thus of providing them only once instead of once per measurement position. The Wiegand wire and the reading head magnets with which the Wiegand effect is triggered are therefore moved along with the reading head. To generate the required change in the magnetic field on moving past the measurement graduations, the magnetic field of one of the reading head magnets is temporarily suppressed. For this purpose, the measurement graduations of the physical scale include magnetic short-circuit elements. The magnetic field of a reading head magnet is short-circuited in a respective relative position of the reading head with respect to the physical scale and thus does not have a magnetic effect, or only has a weakened magnetic effect, on the Wiegand wire which is thus above all located in the remaining magnetic field of the other reading head magnet.

The invention has the advantage that the physical scale itself is very simple and can practically be reduced to the material costs of steel sheet or iron sheet. The measurement graduations can be applied equidistantly, for example at a spacing of a few centimeters from one another. Any complex design of the measurement graduations is dispensed with, for example magnets, grooves or Wiegand wires. Physical scales of any desired length can be manufactured in completely the same form.

The bistable magnetic element preferably has a soft magnetic core and a hard magnetic jacket and shows an abrupt reverse magnetization of the core and/or of the jacket on introduction into an external magnetic field of a magnet of opposite polarity, with the bistable magnetic element in particular being a Wiegand wire. The term bistable magnetic element is a generalization of the term Wiegand wire. Magnetic elements are meant by this which have large associated regions of different magnetic hardness or coercive force and which thus show a large, reproducible Barkhausen jump on the folding over of one of these associated regions. Such bistable magnetic elements deliver a clearly detectable induced pulse in an external magnetic field, said pulse being evaluated for the counting of the length measurement. The Wiegand wire is a very well-known and proven example of a bistable magnetic element. The specific geometries, materials or manufacturing processes of the bistable magnetic elements are less important than the induced voltage surges, with their characteristic being able to be optimized by the specific design of the bistable magnetic element.

A coil is preferably associated with the bistable magnetic element, with a voltage surge being able to be induced into the coil on a reverse magnetization of the bistable magnetic element. The Wiegand effect thus becomes detectable for the length measurement system. The bistable magnetic element is particularly preferably arranged in an inner space of the coil to maximize the voltage surge.

A non-volatile counter is advantageously provided which counts the measurement graduations traveled over by relative movement of the reading head with respect to the physical scale, in particular in that the count can be counted up or down on the basis of voltage surges induced by the bistable magnetic element. The non-volatile counter is supplied by the voltage surge and thus has autonomous energy. In this manner, the count signal is available independently of an activation state of the length measurement apparatus or of the installation in which it is used.

In this respect an evaluation unit is preferably provided in which the absolute position of the reading head with respect to the physical scale can be determined from the count so that the length measurement apparatus is made as an absolute length measurement apparatus. An absolute position signal effectively arises from the incremental count signal because the count is never lost. Reference travels or the like are not necessary. The physical scale does not require any complex encoding despite the output absolute positions and allows practically any desired lengths, which only depends on the counter range. With measurement graduations of a few centimeters spacing, an 8-bit counter is already sufficient for orders of magnitude of a few meters; with a 16-bit counter or even a 32-bit counter, all practically required lengths can also be detected with denser measurement positions.

At least one additional magnetic sensor is preferably provided, in particular a Hall sensor, an AMR sensor (anisotropic magnetoresistance) or a GMR (giant magnetoresistance), with a direction of the relative movement of the reading head with respect to the physical scale and/or an intermediate position of the reading head with respect to adjacent measurement graduation elements being able to be determined in an evaluation unit using the additional magnetic sensor, in particular in that the reading head has a plurality of magnetic sensors arranged next to one another to compare the strength of the magnetic field at the respective positions of the magnetic sensor. Count pulses with the correct counting direction are evaluated via the direction of movement so that, independently of a movement pattern of the reading head, the count represents its absolute position on the physical scale. The measurement precision of the length measurement is refined beyond the spacing between two measurement graduation elements via the intermediate position.

The evaluation unit and/or the additional magnetic sensor can preferably be supplied with energy by voltage surges induced by the bistable magnetic element. The length measurement apparatus thus has autonomous energy. The independence of the count from an external energy supply is particularly important so that the absolute position always remains known. An additional energy supply is possible easier in the actual active operation of the installation and of the length measurement apparatus. It is nevertheless advantageous if as many elements as possible work with energy autonomy. Working with autonomous energy is only possible within limits for an interpolation between two measurement graduation elements as long as a sufficiently continuous relative movement takes place. If the reading head is stationary or if it only moves between two measurement graduation elements, the voltage surges do not take place and no energy therefrom is available. The count does not change in this process, or as soon as a measurement graduation element is to be counted, it also provides the energy required for the counting via the generated voltage surge.

The short-circuit elements preferably have a U-shaped hoop whose ends enclose the poles of the first reading head magnet or of the second reading head magnet in the first relative position or in the second relative position respectively. Such short-circuit elements can be manufactured very easily and likewise particularly effectively suppress the magnetic field of the respective reading head magnet located at a measurement graduation element. Alternatively, the first reading head magnet and the second reading head magnet are in horseshoe shape and the short-circuit elements are configured in elongated form to short-circuit the poles of the horseshoe. This has the advantage that particularly simple measurement graduation element are used and thus an inexpensive physical scale is produced which is even easier to handle.

The short-circuit element, in particular the physical scale together with the measurement graduation elements, preferably comprise magnetic material such as steel or iron. Manufacturing the physical scale together with the measurement graduation elements and the short-circuit elements uniformly from the same material represents a particular lack of complexity. Short-circuit elements of steel or iron are inexpensive with respect to other magnetic materials.

The bistable magnetic elements and the reading head magnets are preferably aligned parallel to one another, with the reading head magnets being arranged at respective equal spacings at both sides of the bistable magnetic element, in particular so that the reading head magnets have a smaller spacing from one another than two adjacent measurement graduation elements. In this arrangement, the reading head magnets act particularly effectively and in clearly evaluable dependence on the position with respect to the measurement graduation elements on the bistable magnetic element.

In a preferred further development of the invention, the elongated physical scale has twists or arcs to adapt to different geometries to be measured. Physical scales of such three-dimensional shape are also understood as elongated in this description because the reading head moves in the longitudinal extent, albeit possibly along complex curve series. The measurement principle allows physical scales to be formed with straight lines and arcs, that is to bend the physical scale in almost any desired manner. A three-dimensional geometric design is thus also possible which covers a larger application field for the length measurement apparatus in accordance with the invention.

The length measurement apparatus can thus preferably also be formed as a measuring apparatus for an angle of rotation in that the elongated physical scale has a circular curvature. The measured length is then a piece of an arc of a circle, thus an angle in circular measure in units of the circle radius. The possible area of use of the length measurement apparatus is thus again extended.

The method in accordance with the invention can be designed in a similar manner by further features and shows similar advantages in this process. Such further features are described by way of example, but not exclusively, in the subordinate claims dependent on the apparatus claim.

Figure 2:
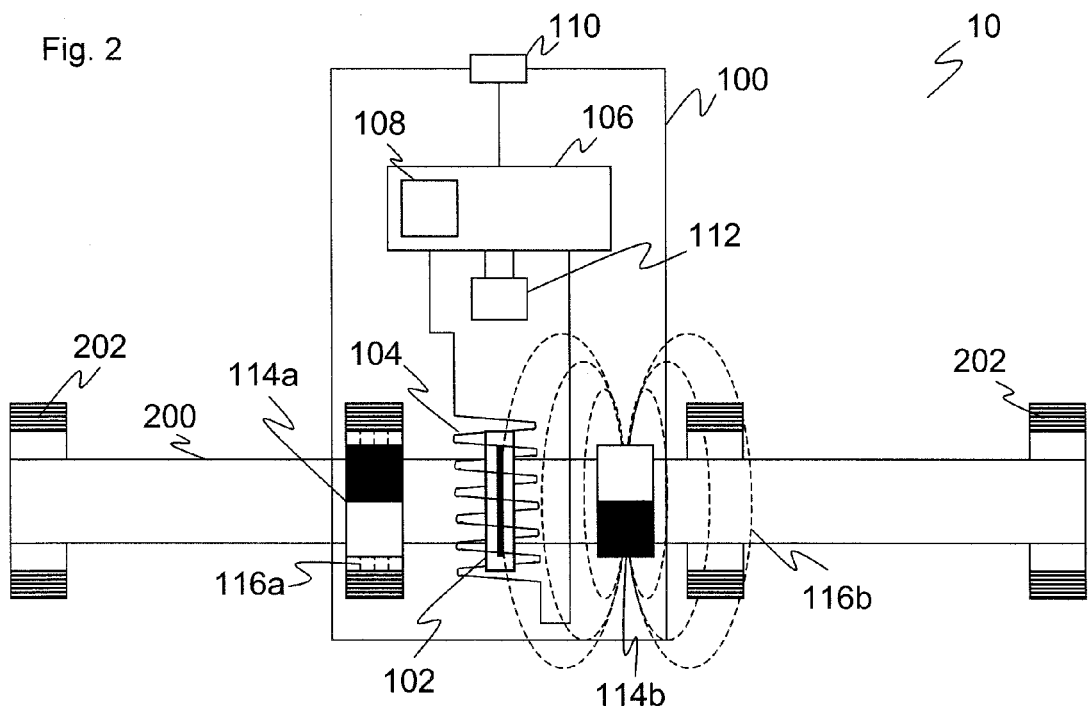
Figure 3:
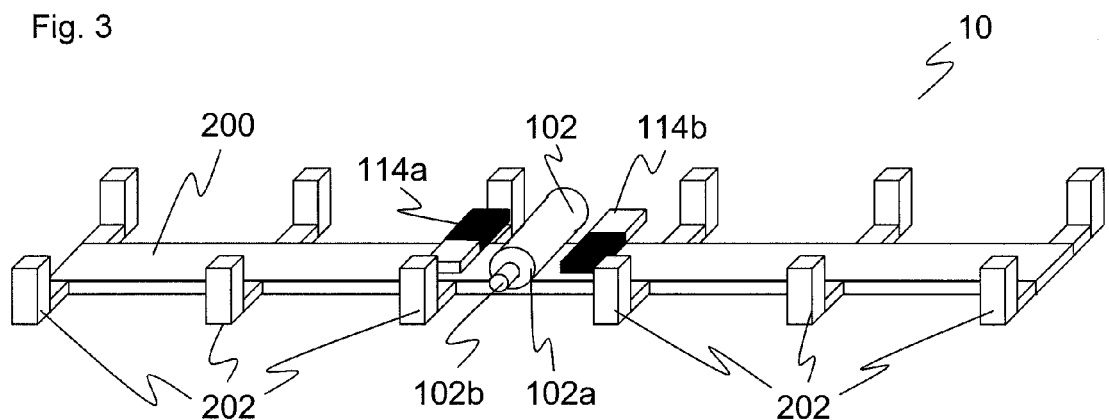
Figure 4:
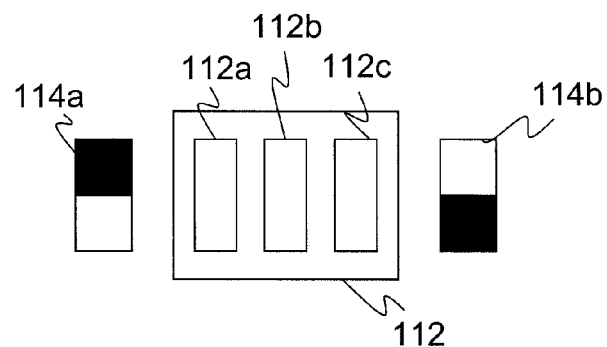
Figure 5:
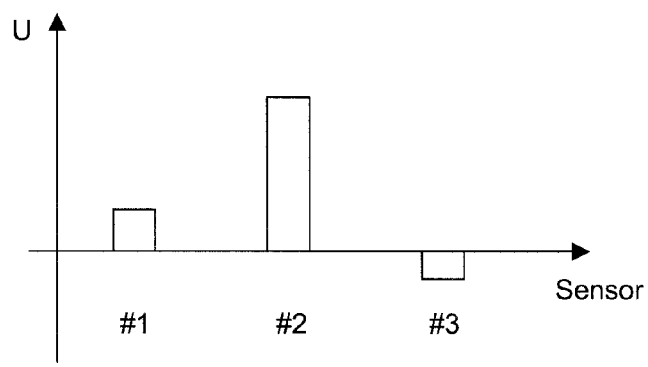
Figure 6A:
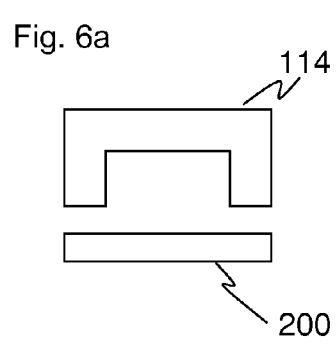
Figure 6B:
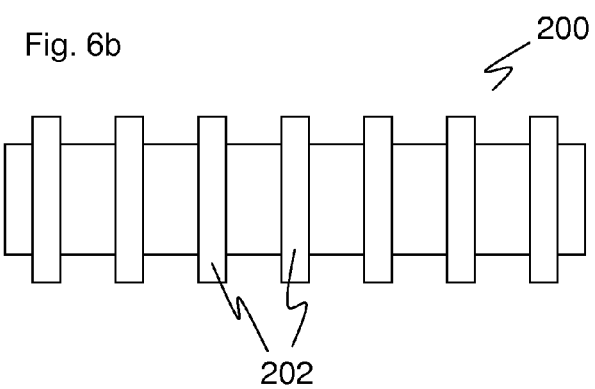
Figure 7:
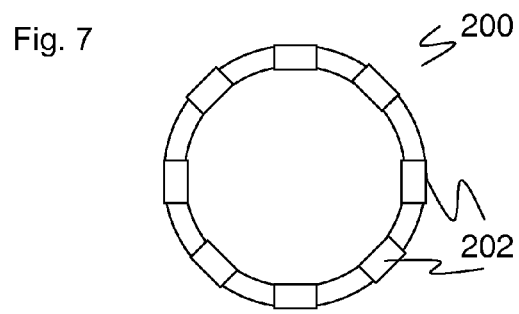

The invention will also be explained in the following with reference to further advantages and features and to the enclosed drawing with regard to embodiments. The Figures of the drawing show in:

FIG. 1 a schematic plan view of a reading head of a length measurement apparatus in accordance with the invention;

FIG. 2 a plan view of a physical scale in accordance with the invention above which a reading head in accordance with FIG. 1 is arranged;

FIG. 3 a three-dimensional view of the physical scale in accordance with FIG. 2 with a simplified representation of some elements of the reading head for illustrating the spatial arrangement;

FIG. 4 a simplified sectional representation of a reading head in accordance with the invention for explaining the interpolation between measurement graduations;

FIG. 5 an exemplary voltage measurement at an intermediate position of the reading head in accordance with FIG. 4;

FIG. 6a a cross-sectional representation of an embodiment of the reading head as a horseshoe magnet;

FIG. 6b a plan view of a physical scale with elongated measurement graduations for the reading head in accordance with FIG. 6a; and FIG. 7 a longitudinal section of a physical scale arranged with respect to a circle.

FIG. 1 shows a schematic plan view of a reading head 100 of a length measurement apparatus in accordance with the invention. A Wiegand wire 102 having a soft magnetic core 102a and a hard magnetic jacket 102b is arranged in the inner space of a coil 104. The two ends of the coil 104 are connected to an evaluation unit 106 which has a counter 108 with a non-volatile memory. The evaluation unit 106 also controls an output 110. A display, not shown, can additionally or alternatively be provided. An additional, rather magnetic sensor 112, for example a Hall sensor, an AMR sensor or a GMR sensor, is connected to the evaluation unit 106. The additional sensor 112 can also have a plurality of magnetic sensors and will be explained in more detail further below in connection with FIG. 4.

A reading head magnet 114a-b configured, for example as a bar-shaped permanent magnet is respectively arranged at both sides of the Wiegand wire 102. The two reading head magnets 114a-b are aligned parallel to one another and to the Wiegand wire 102 and, as illustrated by blackening of the one end, in opposite polarity to one another.

FIG. 2 shows a length measurement apparatus 10 in accordance with the invention in which the reading head 100 is arranged above a physical scale 200. Here as in the following, the same reference numerals designate the same features. Short-circuit elements 202 are strung together at equidistant spacings from one another as a measurement graduation at a spacing of a few centimeters, for example of four centimeters. As can be better recognized in the three-dimensional representation of FIG. 3, the short-circuit elements 202 are made, for example, as U-shaped short-circuit hoops. In this respect, for better clarity in FIG. 3, only the Wiegand wire 102 and the two reading head magnetic 114a-b are shown instead of the whole reading head magnet 100. The short circuit hoops 202 are manufactured from a magnetic material, for example from iron or steel.

In the operation of the length measurement apparatus 10, the reading head 100 is moved relative to the physical scale 200. The two reading head magnets 114a-b are in this respect magnetically short-circuited alternately by the short-circuit hoops 202. FIG. 2 shows a situation where the first reading head magnet 114a is located in a short-circuit hoop 202. Its magnetic field 116a is therefore outwardly practically not effective. Remaining weak scatter fields due to a non-perfect short-circuit are not taken into account here. Practically only the magnetic field 116b of the second reading head magnet 114b thus acts in the Wiegand wire.

In another position of the reading head 100, actually the reverse situation arises in which the first reading head magnet 114a becomes free again and the second reading head magnet 114b is arranged in a short-circuit hoop and thus practically only the magnetic field of the first reading head magnet 114a acts with reverse polarity on the Wiegand wire 102. In other positions of the reading head 100, none of the reading head magnets 114a-b is located in a short-circuit hoop at times. The two magnetic fields 116a-b of both reading head magnets 114a-b are then superimposed on one another, with them almost cancelling out one another with equally strong magnets and a symmetrical arrangement at the location of the Wiegand wire 102.

During the movement of the reading head 102 above the physical scale 200, the polarity of the magnetic field 116a-b acting on the Wiegand wire 102 switches over by arrangement of the first reading head magnet 114a or of the second reading head magnet 114b in a short-circuit element 202. The Wiegand wire 102 changes its magnetization abruptly and independently of the speed of change when a specific magnetic field strength is reached, for example in the position with a short-circuited first reading head magnet 114a. Then the Wiegand wire 102 ignites and induces a voltage surge in the coil 104. The Wiegand wire 102 is newly biased with opposite polarity, for example in the position with a short-circuited second reading head magnet 114b.

The voltage surge induced in the coil 104 is registered in the evaluation unit 106. In this respect, the energy of the voltage surge is utilized to count the passing of the measurement graduations 202 without any additional energy supply of the evaluation unit 106 and to store the count in a non-volatile manner in the counter 108. The counter 108 has a FRAM (ferroelectric random access memory) for the non-volatile storage, for example.

As shown in FIG. 4, in a preferred embodiment, the additional magnetic sensor 112 has a total of three Hall sensors 112a-c which are arranged next to one another and which alternatively also work with a different magnetic effect than the Hall effect, for instance with one of the above-named. The Wiegand wire 102 has been omitted for reasons of clarity and is therefore located, for example, at a different depth with respect to the plane of the paper of FIG. 4. The three Hall sensors 112a-c recognize the absolute position between two measurement graduations 202 and thus increase the measurement precision to fractions of the spacing of two measurement graduations 202.

FIG. 5 shows purely by way of example the Hall voltages of the three Hall sensors 112a-c at a specific position of the reading head 100. If the reading head 100 shifts, these Hall voltages change with every change of position due to the reduction and build-up of the magnetic fields on entry and exit of a reading head magnet 114a- into and out of a short-circuit element 202. The evaluation unit 106 calculates the intermediate position of the reading head 100 from the shift of the Hall voltage profile over the three Hall sensors 112a-c.

The intermediate position thus determined is linked to the counter information of the counter 108. Absolute measurements can thus be achieved over the total measurement range with measurement precisions far below a millimeter. It is also conceivable to use a different number of Hall sensors 112a-c, with the number three representing an optimum of measurement precision and apparatus effort in a number of applications. In a simplified execution position, the determination and evaluation of intermediate positions is dispensed with and the length measurement is determined solely from the measurement graduation 202 whose absolute position is known via the count.

The evaluation unit 106 uses the indication of direction of the additional magnetic sensor 112 to determine the direction of counting for the counter 108 having autonomous energy. For this purpose, the information of an arrangement of a plurality of Hall sensors 112a-c interpolating the intermediate position can be used. It is particularly advantageous to use an additional Hall sensor, not shown, having a very low power consumption for the determination of direction which is supplied with energy solely through the voltage surges of the Wiegand wire 102.

The length measurement then works with completely autonomous energy with the resolution of the measurement graduations 202 since the counter 108, the direction-determining Hall sensor and the associated logic are supplied by the Wiegand wire 102. During active operation, that is, for example, when the installation is switched on and the length measurement 10 is read out, external energy is available to supply the evaluation unit 106 and the additional magnetic sensor 112. It is thus not absolutely necessary also to determine the intermediate position with autonomous energy since whenever an intermediate position should be determined, external energy is anyway available for the readout of the position to an external control. Alternatively, particularly with a frequent movement, it is also conceivable that the energy of the voltage surges induced by the Wiegand wire 102 also at least partly supply the Hall sensors 112a-c and the associated logic in the evaluation unit 106.

The length measuring arrangement 10 thus admittedly works as an incremental counter. Since, however, the counter information always remains available and the counter 108 has energy autonomously due to the voltage surges, an absolute gauge for the length or the position results from the point of view of the user.

FIG. 6a shows in a cross-section an alternative embodiment of the reading head magnets 114a-b and FIG. 6b shows a plan view of an associated physical scale 200. Here, as it were in an inversion of the geometric design of FIG. 3, the reading head magnets 114 are horseshoe magnets and the measurement graduations 202 are elongated. This has the advantage of a yet simpler physical scale 202. The carrier of the physical scale 200 on which the measurement graduations 202 are attached should in this case either be completely non-magnetic, for example comprising plastic, or at least be considerably narrower than the measurement graduations 202 themselves so that no magnetic short circuit takes place in the intermediate regions between two measurement graduations 202. This embodiment illustrates that for the length measurement it is the possibility of the position-dependent suppression of the magnetic field of a respective reading head magnet 114a-b which is important and less the specific geometrical shape of reading head magnets 114a-b and measurement graduations 202.

FIG. 7 illustrates in a longitudinal section through a circular physical scale 200 that the principle of the invention can be extended to physical scales of practically any desired shape. An encoder can thus also be realized which measures the angular position and, optionally, also the count of revolutions instead of a length extent. This is an example for the almost unlimited three-dimensional design possibilities for the physical scale 200 with which an adaptation to a plurality of conceivable applications is possible.

The invention claimed is:

1. A length measurement apparatus (10), comprising:
a bistable magnetic element (102), an elongated physical scale (200) having a plurality of measurement graduation elements (202) spaced apart from one another, a reading head (100) which is movable relative to the elongated physical scale (200) in a longitudinal extent, and at least one first reading head magnet (114a) and at least one second reading head magnet (114b) which are arranged transverse to the longitudinal extent and with opposite polarity to one another, wherein:
the bistable magnetic element (102) is part of the reading head (100);
the measurement graduation elements each have a magnetic short-circuit element (202) and an arrangement of one of the first and second reading head magnets (114a-b) at respective measurement graduation elements is configured such that a magnetic field (116a-b) of the reading head magnets (114a-b) is predominantly suppressed by the magnetic short-circuit element (202), wherein the magnetic field (116a b) does not penetrate through the bistable magnetic element (102);
the first and second reading head magnets (114a-b) are spaced apart from one another so that the short-circuit element (202) substantially suppresses only the magnetic field (116a) of the first reading head magnet (114a) in a first relative position of the reading head (100) and substantially suppresses only the magnetic field (116b) of the second reading head magnet (114b) in a second relative position of the reading head (100); and
the reading head (100) has a plurality of magnetic sensors (112a-c) arranged next to one another and an evaluation unit (106) is provided which is configured to determine an intermediate position of the reader head (102) with respect to adjacent measurement graduation elements (202) by comparing the strength of the magnetic field at the respective positions of the magnetic sensors (112a-e).

2. A length measurement apparatus (10) in accordance with claim 1, wherein the bistable magnetic element (102) has a soft magnetic core (102a) and a hard magnetic jacket (102b) and shows an abrupt reverse magnetization of at least one of the core (102a) and of the jacket (102b) on introduction into an external magnetic field (116a-b) of a magnet of opposite polarity, with the bistable magnetic element (102) in particular being a Wiegand wire.

3. A length measurement apparatus (10) in accordance with claim 1, wherein a coil (104) is associated with the bistable magnetic element (102), wherein the bistable magnetic element (102) is in particular arranged in an inner space of the coil (104), and wherein a voltage surge can be induced in the coil (104) on the reverse magnetization of the bistable magnetic element (102).

4. A length measurement apparatus (10) in accordance with claim 1, wherein a non-volatile counter (108) is provided which counts the measurement graduations (202) traveled over by relative movement of the reading head (100) with respect to the physical scale (200), in particular in that the count (108) can be counted up or down on the basis of voltage surges induced by the bistable magnetic element (102).

5. A length measurement apparatus (10) in accordance with claim 4, wherein an evaluation unit (106) is provided in which the absolute position of the reading head (100) with respect to the physical scale (200) can be determined from the count (108) so that the length measuring apparatus (10) is made as an absolute length measurement apparatus (10).

6. A length measurement apparatus (10) in accordance with claim 5, wherein at least one of the evaluation unit (106) and the additional magnetic sensor (112) can be supplied with energy by voltage surges induced by the bistable magnetic element (102).

7. A length measurement apparatus (10) in accordance with claim 1, wherein the magnetic sensors (112) are selected from a group consisting of Hall sensors, AMR sensors, and GMR sensors.

8. A length measurement apparatus (10) in accordance with claim 7, wherein at least one of the evaluation unit (106) and the additional magnetic sensor (112) can be supplied with energy by voltage surges induced by the bistable magnetic element (102).

9. A length measurement apparatus (10) in accordance with claim 1, wherein the short-circuit elements (202) have a U-shaped hoop whose ends enclose the poles of the first reading head magnet (114a) or of the second reading head magnet (114b) in the first relative position or in the second relative position respectively, or wherein the first reading head magnet (114a) and the second reading head magnet (114b) are made in horseshoe shape and the short-circuit elements (202) are made elongated to short-circuit the poles of the horseshoe.

10. A length measurement apparatus (10) in accordance with claim 1, wherein the bistable magnetic element (102) and the reading head magnets (114a-b) are aligned parallel to one another, and wherein the reading head magnets (114a-b) are arranged at respective equal spacings from both sides of the bistable magnetic element (102), in particular so that the reading head magnets (114a-114b) have a smaller spacing from one another than two adjacent measurement graduation elements (202).

11. A length measurement apparatus (10) in accordance with claim 1, wherein the elongated physical scale (200) has twists or arcs to adapt to different geometries to be measured and which is in particular made as a measuring apparatus for an angle of rotation in that the elongated physical scale (200) has a circular curvature.

12. A length measurement apparatus (10) in accordance with claim 1, wherein the short-circuit elements (202), in particular the physical scale (200) together with the measurement graduation elements (202), comprise magnetic material such as steel or iron.

13. A length measurement apparatus in accordance with claim 1,
wherein the evaluation unit (106) is configured to determine a direction of the relative movement of the reading head (100) with respect to the physical scale (200) using the magnetic sensors (112).

14. A method for length measurement, comprising:
providing a reading head (100) which includes at least one first reading head magnet (114a) and at least one second reading head magnet (114b), an elongated physical scale (200) having a plurality of measurement graduation elements (202) spaced apart from one another, wherein the reading head magnets (114a-b) are arranged transverse in a longitudinal extent and are arranged with opposite polarity to one another, and wherein a bistable magnetic element (102) is used for determining the position of the reading head (100),
moving the at least one first and second reading head magnets (114a-b) and the bistable magnetic element (102) along the elongated physical scale (200) as part of the reading head (100); wherein the first and second reading head magnets (114a-b) are further arranged such that in a first relative position of the reading head (100) only one of the first and second reading head magnets (114a-b) is positioned at a magnetic short-circuit element (202) of a measurement graduation element, and in a second relative position of the reading head (100), the other of the first and second reading head magnets (114a-b) is positioned at a magnetic short-circuit element (202) of a measurement graduation element, such that in the first and second relative positions, substantially only the respective magnetic field (114a-b) of only one of the first and second reading head magnet (114a-b) penetrates through the bistable magnetic element (102), and
determining an intermediate position of the reading head (100) with respect to adjacent measurement graduation elements (202) is determined by evaluation of the strength of the magnetic field using a plurality of magnetic sensors (112a-c) arranged next to one another.

15. A method in accordance with claim 14,
wherein at least one of the first reading head magnet (114a) and the second reading head magnet (114b) cause an abrupt reverse magnetization in the bistable magnetic element (102) during the relative movement, and wherein the measurement graduation element (202) traveled over are counted with reference to a voltage surge induced by the reverse magnetization in a non-volatile counter (108), wherein the absolute position of the reading head (100) with respect to the physical scale (200) is determined from the count (108).

16. A method in accordance with claim 15,
wherein the energy required for at least one of the functions of counting, determining the absolute position, determining the direction and determining the intermediate position, is produced by the voltage surges induced on the reverse magnetization of the bistable magnetic element (102).

17. A method in accordance with claim 14,
wherein the magnet sensors (112) are selected from a group consisting of Hall sensors, AMR sensors, and GMR sensors.

18. A method in accordance with claim 14,
wherein a direction of the relative movement of the reading head (100) with respect to the physical scale (200) is measured with the magnet sensors (112).

* * * * *